United States Patent [19]

Stewart

[11] Patent Number: 5,572,381
[45] Date of Patent: Nov. 5, 1996

[54] MECHANICAL POWER TRANSMISSION FOR A SIMPLIFIED VIDEO CASSETTE RECORDER APPARATUS

[75] Inventor: David S. Stewart, Palatine, Ill.

[73] Assignee: Zenith Electronics Corporation, Glenview, Ill.

[21] Appl. No.: 72,808

[22] Filed: Jun. 7, 1993

[51] Int. Cl.⁶ .............................. G11B 15/18; G11B 15/66
[52] U.S. Cl. ............................................ 360/85; 360/95
[58] Field of Search ........................... 360/85, 95, 137, 360/96.3, 96.5, 96.6, 130; 242/197, 198, 199, 200, 201, 338

[56] References Cited

U.S. PATENT DOCUMENTS

| | | | |
|---|---|---|---|
| 3,636,277 | 1/1972 | Pohler | 360/84 |
| 4,092,684 | 5/1978 | Umeda | 360/85 |
| 4,353,101 | 10/1982 | Kawai | 360/85 |
| 4,517,613 | 5/1985 | Shibaike et al. | 360/85 |
| 4,616,274 | 10/1986 | Nagaoka | 360/85 |
| 4,642,712 | 2/1987 | Kohda | 360/85 |
| 4,703,138 | 10/1987 | Suzuki | 360/137 |
| 4,704,643 | 11/1987 | Matsuoka et al. | 360/95 |
| 4,788,609 | 11/1988 | Yamada et al. | 360/85 |
| 4,796,116 | 1/1989 | Kwon et al. | 360/85 |
| 4,837,645 | 6/1989 | Miyamoto et al. | 360/95 |
| 4,841,392 | 6/1989 | Muramatsu et al. | 360/85 |
| 4,956,732 | 9/1990 | Moriyama | 360/96.3 |
| 4,984,105 | 1/1991 | Hwang | 360/85 |
| 5,172,283 | 12/1992 | Fukuyama et al. | 360/85 |
| 5,188,311 | 2/1993 | Choi | 360/85 |
| 5,196,971 | 3/1993 | Tsuchiya et al. | 360/85 |

Primary Examiner—Stuart S. Levy
Assistant Examiner—David L. Ometz
Attorney, Agent, or Firm—Roland W. Norris

[57] ABSTRACT

An arrangement of a video tape recording apparatus has a simplified motor and mechanical power transmission arrangement which yields benefits for cost, reliability and space savings by reducing the number of motors and moving parts necessary to provide an operable video tape recording or playback apparatus.

4 Claims, 3 Drawing Sheets ns Patent 5,572,381

MECHANICAL POWER TRANSMISSION FOR A SIMPLIFIED VIDEO CASSETTE RECORDER APPARATUS

BACKGROUND OF THE INVENTION

1) Field of the Invention

The present invention relates generally to video cassette recorders (VCRs). More particularly the present invention relates to a VCR having a mechanical power transmission apparatus suitable for reducing the overall size of the VCR and for increasing its economy and reliability.

2) Discussion of the Related Art

Several operations must happen in order to effect the playback of a contemporary video cassette in a VCR.

The tape must be loaded, or placed over the spool drives and threading arms (with the cassette door unlocked and raised).

The threading arms must bring the tape forward onto the rotating drum, and, the pinch roller must be positioned to place the tape against the capstan and the spool drives must turn to take up the tape.

Contemporary VCR design utilizes at least three motors to accomplish these tasks:

a) a drum motor for turning the drum, b) a capstan motor for driving the capstan and spool drives, and c) a mode-control motor for loading and threading the tape, positioning the pinch roller and affecting other mechanical actions.

Additional motors may be added on some designs to accomplish these separate functions.

Also, trends are to make the VCR smaller and less expensive. Therefore, many motors or complex transmission systems are undesirable. It is therefore desirable to reduce the number of motors and transmission parts in a VCR to attain economies of cost and complexity and increase the reliability of a VCR as well as to make the VCR smaller.

BRIEF DESCRIPTION OF THE DRAWINGS

Other attendant advantages will be more readily appreciated as the invention becomes better understood by reference to the following detailed description and compared in connection with the accompanying drawings in which like reference numerals designate like parts throughout the figures. It will be appreciated that the drawings may be exaggerated for explanatory purposes.

DESCRIPTION OF THE PREFERRED EMBODIMENT

Figure 1:
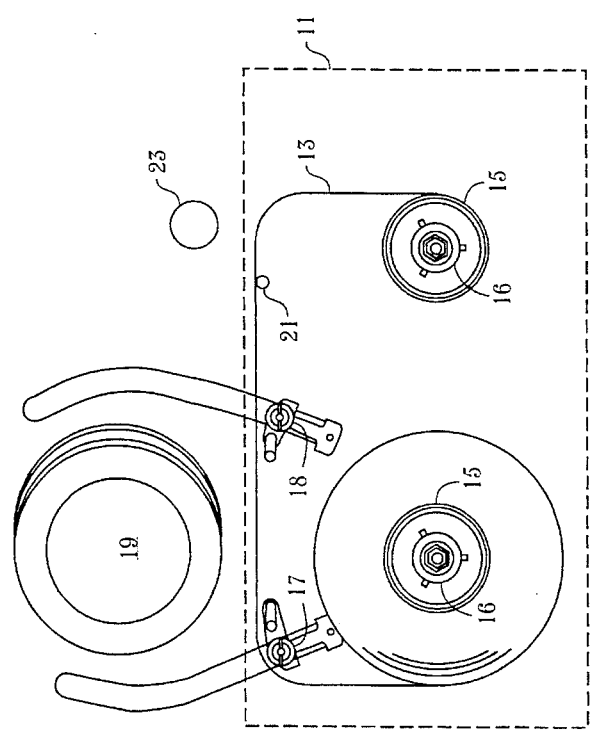
FIG. 1 is a top plan schematic view of VCR parts helpful for explanation of the present invention.

As seen in FIG. 1, a video cassette containing tape 13 is initially loaded such that spools 15 fit over spool drives 16 and the tape 13 is placed between the threading arms 17, 18 and drum 19 which spins when the tape 13 is being read by the "heads" (not shown) within the drum 19. The tape 13 is also placed between the capstan 21 and pinch roller 23. During tape movement the capstan 21 spins to provide a friction drive for the tape 13 which travels in contact between the capstan 21 and the pinch roller 23, which is an idler wheel.

Figure 2:
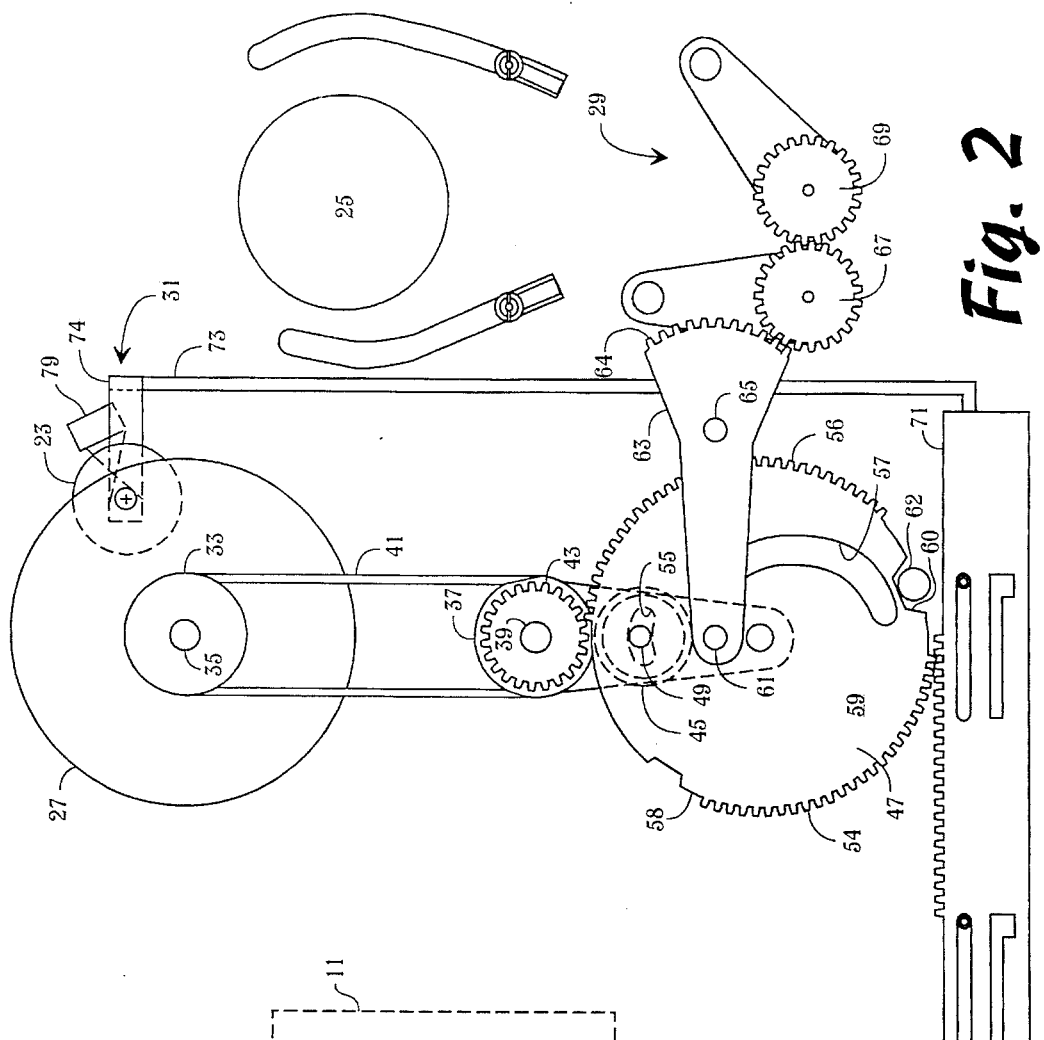
FIG. 2 is a bottom plan view of a reduced motor and simplified transmission VCR according to the present invention.

As seen in the bottom view of FIG. 2, a drum motor 25 is located beneath the drum 23. The drum motor is necessarily active to turn the drum 23 only during playback or reading, and recording of the tape 13. A capstan motor 27 is located beneath the capstan 21 (FIG. 1) and, as it supplies motive force to both the capstan and the spool drives 16 (FIG. 1) is necessarily active during transport of the tape. However, only during reading and recording of the tape is precise speed control of the capstan motor necessary.

According to the present invention, in consideration of the necessary operations to be performed by the VCR, by providing means to have the capstan motor power the tape threading and pinch roller positioning, the need for a mode control motor to perform these functions is eliminated. Further, by providing the power transmission through a simple drive gear, great economies of space are realized.

Figure 3:
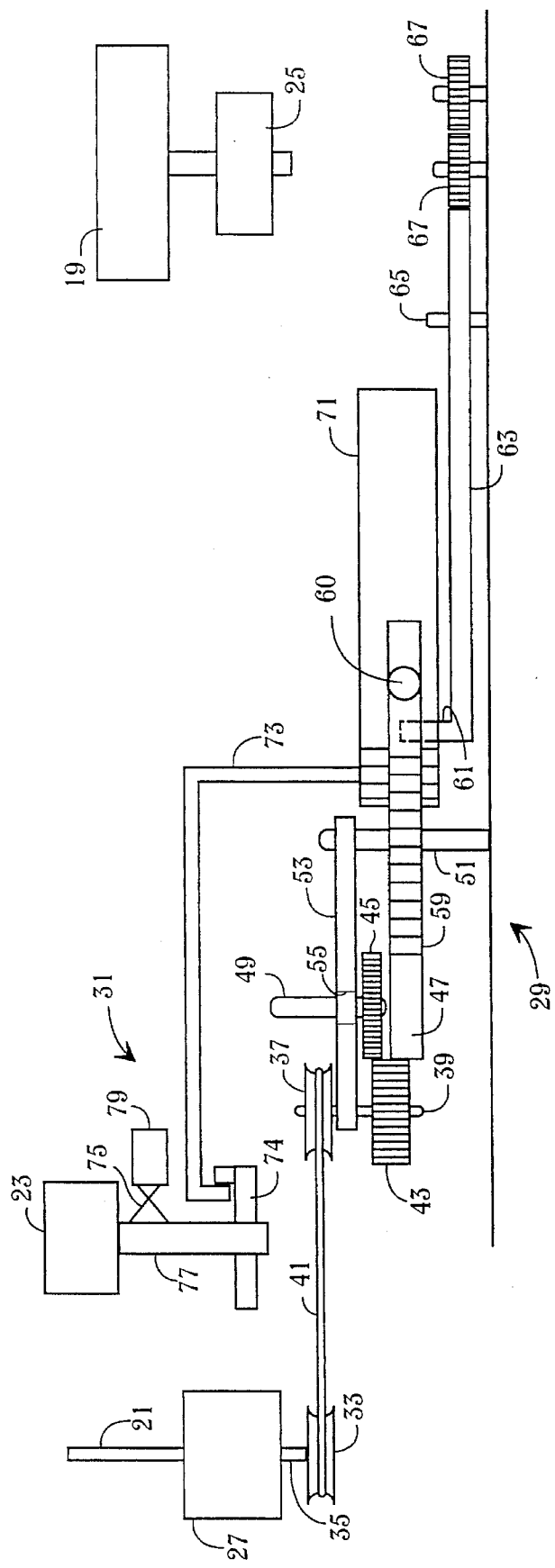
FIG. 3 is a side elevation view of FIG. 1.

Referring again to FIG. 2, and also to FIG. 3, there is shown a mechanical power transmission apparatus for operably connecting the tape threading mechanism 29, the spool drives 16, and the pinch roller assembly 31 to the capstan motor 27.

Beginning with the tape threading mechanism 29, a first pulley 33 is attached to the bottom of the capstan motor spindle 35. A second pulley 37, mounted on a first axle 39, is driven by the first pulley 33 through a belt 41. A drive gear 43 is attached to the first axle 39 and vertically spaced beneath the second pulley 37. The drive gear 43 contacts both a spool drive gear 45 and a cam gear 47. The spool drive gear 45 is attached to a first fixed rotatable post above the cam gear 47. The spool drive gear 45 then subsequently drives a toggling intermediate gear (not shown) which then drives the forward and reverse spool drives 16 (FIG. 1) as would be known in the art.

The cam gear 47 is mounted on a second fixed rotatable post 51. The second fixed rotatable post 51 serves as a pivot post for a toggle arm 53 which carries the first axle 39 and its attached second pulley 37 and drive gear 43. The toggle arm 53 has a center cut out 55 which surrounds the first fixed rotatable post 49 and serves to limit the travel of toggle arm 53. The cam gear 47 has a track 57 on its lower planar face 59 into which is fitted a drive pin 61 of a fan gear 63.

The cam gear toothed face 56 has untoothed portions 58 having detents 60 therein for contacting a spring-biased pole or ball 62 (FIG. 2) which urges the cam gear toothed face 56 away from the teeth of the drive gear 43 when the threading operation is complete. These detents could alternatively be located on a planar face of the cam gear if desired.

The fan gear 63 is a spatulate gear, toothed on its broad semicircular end 64 opposite the drive pin 61. The fan gear 63 pivots about a fixed post 65 passing perpendicularly through the fan gear 63 medially along the fan gear longitudinal axis.

The fan gear toothed semicircular end 64 contacts the threading drive gears 67, 69 for movement of the threading arms 17, 18 through linkages (not shown) as is known in the art.

In operation, when the cassette viewer selects the VCR play or record function the capstan motor spindle 35 drives the first pulley 33 which in turn drives the second pulley 37 through the belt 41. The first axle 39 is thus rotated, causing the drive gear 43 to turn the spool drive gear 45. The friction associated with this action causes the toggle arm 53 to move the drive gear 43 into contact with the toothed face 56 of the cam gear 47. Toggling movement stops when the cutout 55 contacts the first fixed rotatable post 49. The cam gear 47 thus rotates causing the cam gear track 57 to force the fan gear drive pin 61 in a first direction, or up, in FIG. 2.

The fan gear 63 thus pivots about the fixed post 65 causing its toothed semicircular end 64 to move in a second direction, or down in FIG. 2, thereby driving the threading gear drives which move the threading arms 17, 18 causing the tape 13 to be placed in its operable position around the drum 19. The detent 60 is then positioned to accept the spring biased ball 62 which separates the cam gear 47 from interaction with the drive gear 43 allowing the capstan motor 27 to run at its intended speed for normal tape drive.

The pinch roller 23, as best seen in FIG. 3, is operated through a second toothed portion 54 of the cam gear 47 through a toothed slider plate 71, similar arrangements being known in the art. The slider plate 71 controls an armature 73 which engages a carrier plate 74 of the pinch roller 23 to appropriately control the action of a bias spring 75 secured between the shaft 77 of the pinch roller 23 and a fixed frame member 79.

Figure 4:
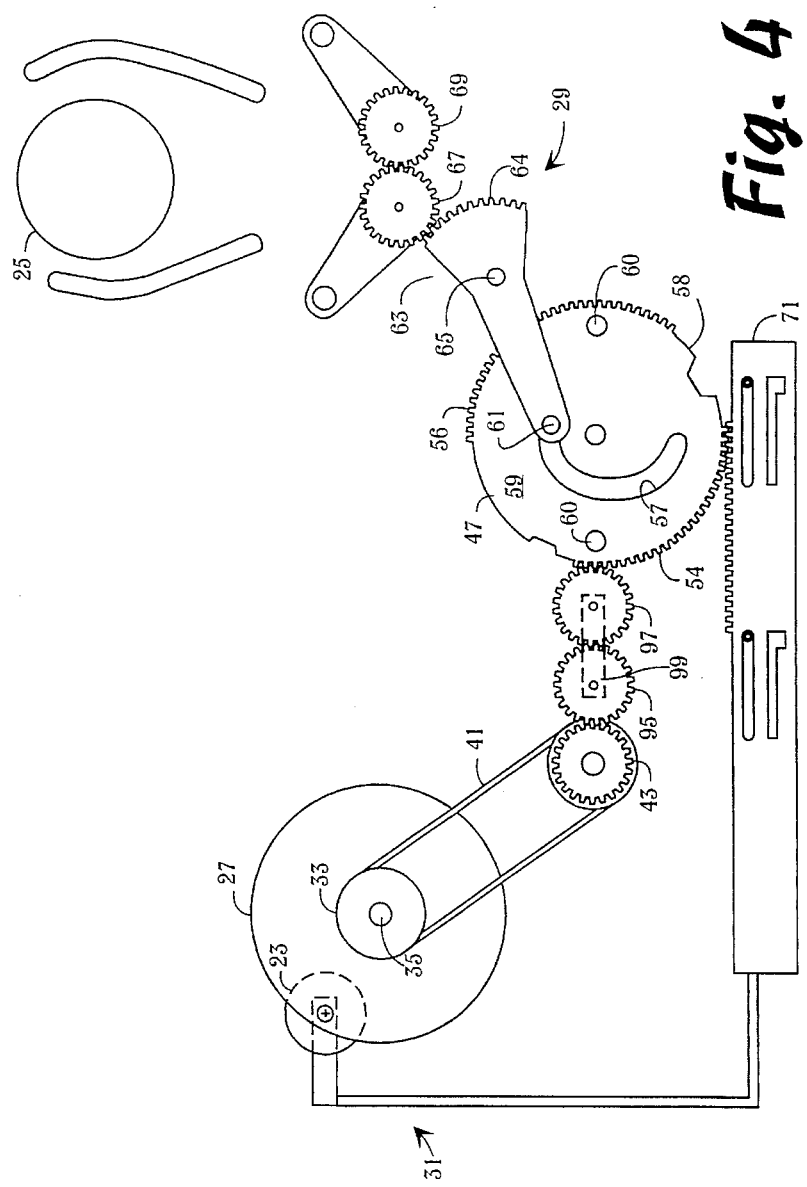
FIG. 4 is a bottom plan view of an alternative embodiment of a VCR apparatus according to the present invention.
Figure 5:
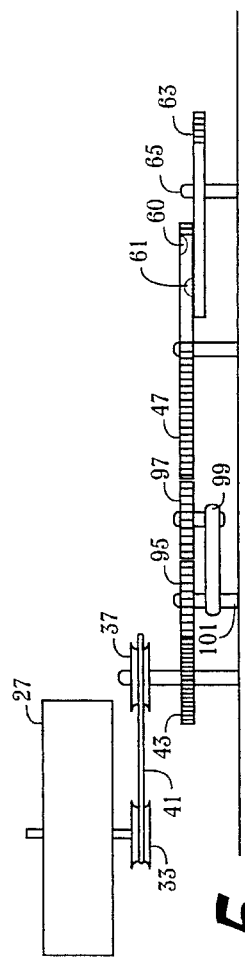
FIG. 5 is a side view of FIG. 4.

Many alternatives to the mechanical layout disclosed in the preferred embodiment may be workable upon reflection by the artisan. For example, as seen in FIGS. 4 and 5, the drive gear 43 may be drivingly connected to the cam gear 47 through a transmission 93 having a first gear 95 meshing with the drive gear 43 and a second gear 97. The second gear 97 then meshes with the cam gear 47 when friction causes a pivot plate 99, to which the first gear 95 and second gear 97 are mounted, to move the second gear 97 into contact with the first toothed face 56 of the cam gear 47. The pivot plate 99 is secured to a third fixed rotatable post 101 which can also serve as the axle 103 of the first gear 95. This arrangement allows the drive gear 43 to remain in a fixed position with constant belt tension rather than toggling as in the embodiment of FIGS. 2 and 3. Other systems such as the spool drive (not shown), tape threading mechanism 29, and pinch roller assembly 31 operate in similar manners to those discussed in connection with FIGS. 2 and 3. It is noted that the detents 60 in the cam gear 47 are shown on the lower planar face 59 of the cam gear in FIG. 4.

By following the teachings of the present disclosure, the cost and complexity of the VCR can be significantly reduced while heightening its reliability and reducing its overall size.

While the present invention has been illustrated and described in connection with the preferred embodiments, it is not to be limited to the particular structure shown, because many variations thereof will be evident to one skilled in the art and are intended to be encompassed in the present invention as set forth in the following claims.

What is claimed is:

1. A mechanical power assembly for a rotary drum VCR with retractable threading arms for the tape path, a pinch roller and capstan assembly for tape speed control, and a spool drive for taking up tape within the video cassette, comprising:
   a) a first motor for directly driving the capstan, and for moving the tape threading arms and the pinch roller, the first motor having a shaft with a first single pulley attached thereto;
   b) a second pulley and a drive gear vertically spaced, and attached to a first axle;
   c) a drive belt, drivingly connecting the second pulley and the drive gear to the single pulley;
   d) a toggle arm fixedly connected to the first axle at a first end thereof and pivotably connected at a second end thereof to a second fixed rotatable post, the toggle arm having a center-cutout surrounding a first rotatable post;
   e) a spool drive gear affixed to the first rotatable post, the spool drive gear meshing with the drive gear for powering spool drives for the video cassette;
   f) a cam gear affixed to the second rotatable post and spaced from the toggle arm, the cam gear having:
      1) a curved groove on a planar face thereof,
      2) first and second toothed curved faces, the first toothed and curved face meshing with the drive gear, the second toothed and curved face meshing with a slider plate;
   g) a spatulate gear operably connected to the curved groove at a first end of the spatulate gear, the spatulate gear further having a central pivot therein, and a toothed face at a second end thereof for driving gears connected to the tape threading arms;
   h) a pinch roller assembly operably connected to the slider plate for movement of the pinch roller proximal and distal to the capstan.

2. The assembly of claim 1 wherein the cam gear further comprises:
   detents thereon for motion control of the cam gear.

3. A mechanical power assembly for a rotary drum VCR with retractable threading arms for the tape path, a pinch roller and capstan assembly for tape speed control, and a spool drive for taking up tape within the video cassette, comprising:
   a) a first motor for directly driving the capstan, and for moving threading arms and a pinch roller, the first motor having a shaft with a first single pulley attached thereto;
   b) a second pulley and a drive gear attached to a first axle and vertically spaced;
   c) a drive belt, drivingly connecting the second pulley and the drive gear to the single pulley;
   d) a toggle arm supporting a gear train, the toggle arm pivotably connected at a first end thereof to a fixed post, the gear train being meshed on a first side thereof, proximate said fixed post, with the drive gear and at a second side thereof with a cam gear;
   e) the cam gear affixed to a second axle, the cam gear having:
      1) a curved groove on a planar face thereof,
      2) first and second toothed curved faces, the first toothed and curved face meshing with the drive gear, the second toothed and curved face meshing with a slider plate;
   f) a spatulate gear operably connected to the curved groove at a first end of the fan gear, the spatulate gear further having a central pivot therein, and a toothed face at a second end thereof for driving gears connected to the threading arms; and
   g) a pinch roller assembly operably connected to the slider plate for movement proximal and distal to the capstan.

4. The assembly of claim 3 wherein the cam gear further comprises:
   detents thereon for motion control of the cam gear.

* * * * *